United States Patent
Bijl (10) Patent No.: US 8,683,739 B2
(45) Date of Patent: Apr. 1, 2014

(54) DEVICE FOR ACCOMMODATING PLANT MATERIAL AND SYSTEM FOR PROCESSING THEREOF

(75) Inventor: John Bijl, Burgh-Haamstede (NL)

(73) Assignees: Visser's-Gravendeel Holding B.V., 's-Gravendeel (NL); Vitro Plus C.V., Burgh-Haamstede (NL)

( * ) Notice: Subject to any disclaimer, the term of this patent is extended or adjusted under 35 U.S.C. 154(b) by 40 days.

(21) Appl. No.: 13/132,299

(22) PCT Filed: Nov. 9, 2009

(86) PCT No.: PCT/NL2009/050676
§ 371 (c)(1),
(2), (4) Date: Jul. 15, 2011

(87) PCT Pub. No.: WO2010/064900
PCT Pub. Date: Jun. 10, 2010

(65) Prior Publication Data
US 2011/0258926 A1    Oct. 27, 2011

(30) Foreign Application Priority Data
Dec. 3, 2008   (NL) ...................................... 1036276

(51) Int. Cl.
*A01C 11/02*        (2006.01)
(52) U.S. Cl.
USPC ................... 47/1.01 P; 47/1.7; 47/65; 47/66.5

(58) Field of Classification Search
USPC ......... 47/1.01 R, 1.01 P, 63, 1.7, 18, 65, 66.5, 47/86, 57.5, 66.1, 77
See application file for complete search history.

(56) References Cited

U.S. PATENT DOCUMENTS

| 4,006,558 A | 2/1977 | Neddo et al. |
| 4,970,824 A * | 11/1990 | Visser ................................ 47/86 |
| 5,924,239 A * | 7/1999 | Rees et al. ....................... 47/1.7 |
| 6,212,821 B1 * | 4/2001 | Adam et al. ............... 47/1.01 R |
| 7,913,450 B2 * | 3/2011 | Van Adrichem ............... 47/57.7 |
| 2002/0110920 A1 * | 8/2002 | Mentzen et al. ............... 436/104 |
| 2004/0144021 A1 * | 7/2004 | Keller et al. ................. 47/1.01 P |
| 2006/0112619 A1 * | 6/2006 | Oderwald et al. ............... 47/1.7 |
| 2007/0190521 A1 | 8/2007 | MacIsaac |
| 2010/0180500 A1 * | 7/2010 | Visser et al. ...................... 47/86 |

FOREIGN PATENT DOCUMENTS

| EP | 0120642 A | 10/1984 |
| EP | 0906722 A | 4/1999 |
| GB | 13471 A | 0/1910 |

* cited by examiner

*Primary Examiner* — Rob Swiatek
*Assistant Examiner* — Lisa Tsang
(74) *Attorney, Agent, or Firm* — Bozicevic, Field & Francis LLP; Bret E. Field; Daniel G. Stoddard (57) ABSTRACT

Aspects of the invention include a device (1) for accommodating plant material (4), such as in particular seed, but also a cutting, a seedling or other plant material. The device (1) comprises at least one holder (2) in which at least the plant material (4), and possibly herein a substrate material (5), can be placed, and the bottom of which is substantially open and can be closed with a closing element (6).

20 Claims, 5 Drawing Sheets

DEVICE FOR ACCOMMODATING PLANT MATERIAL AND SYSTEM FOR PROCESSING THEREOF

The present invention relates to a device for accommodating plant material and a system for processing at least one such device.

In known devices holders are normally applied in which only an access is available for placing plant material in the holder or removing this plant material therefrom. Placing plant material in the holders is in no way a problem per se, particularly because the plant material is then usually still very young. However, removal of the plant material more frequently poses problems. Diverse proposals have been made in the known art. Grippers can for instance be used here, or holders can be deformable for the purpose of pressing the plant material and possible substrate material out of the holders. All these known techniques have the drawback, however, that there is no possible way to prevent a certain amount of waste occurring as a result of damage to the plant material during removal thereof from the holders.

The present invention has for its object to obviate or at least alleviate the above stated drawbacks of the known art. The device and the system according to the present invention are distinguished for this purpose by the measures, or at least the combination thereof, as defined in the independent claims.

With a device and a system according to the present invention it is possible to introduce the plant material into the holder via an access, for instance on the top side, which for this purpose is open, just as in the known art. The access can optionally also be closed after the introduction of the plant material, for instance when the cultivation of plant material under sterile conditions is desired. This can also serve to counter or even prevent drying out during transport, wherein it is optionally desirable for the interior of the for instance tubular holder to be sterile. According to the present invention there is the additional measure that the holder is open and can be closed on the underside, at the bottom in a position of use, or at least opposite the access. The bottom is closed during cultivation of the plant material. This means that the bottom of the holder can be opened at a desired moment. This will normally take place only after a period of time in which the plant material is cultivated in the holder. It is possible here to press the substrate material and the plant material, or only the plant material, out of the holder at the bottom or at least on the side lying opposite the access. The pressure herefor can for instance be generated with a desired quantity of water or air. This quantity of water or air can be provided by means of a nozzle. There is therefore hardly any contact with hard or rigid parts and/or components necessary for the purpose of removing the plant material (and optionally also the substrate material) from the holder.

Further diverse embodiments are possible according to the present invention, which are enumerated in non-limitative manner in the dependent claims, and other embodiments are also possible.

A closure can thus be applied which can be arranged over the bottom. This can be a slide with which the bottom can be closed in order to cultivate plant material in the holder, optionally in substrate material. Such a closure can also be a hinged flap.

In a possible additional or alternative embodiment adhesive tape is provided for the purpose of closing a flap, slide or other closure, or in order to itself form a seal of the normally open bottom when the adhesive tape is arranged over the bottom.

If adhesive tape is applied, it can be arranged on the outer side of the holder, for instance against the outer wall thereof. A better adhesion is thus obtained than when the adhesive tape is arranged only against the edges round the open bottom.

Additionally or alternatively it is possible within the scope of the invention to apply a sealing foil. This can for instance be arranged with a heat sealing on at least the edge round the opening at the bottom of the holder in order to bring about a sealed closure of the opening.

The access lying opposite the bottom is substantially open and can be closed, preferably with an access closing element. A possible reason for also wanting to close the access, just as the bottom, may be to enable cultivation of plant material under sterile conditions. This is often the case particularly with seeds and/or tissue culture. Use can then also be made of a closure, an adhesive tape or a sealing foil.

The holder preferably has a form and dimension which are constant at least in the vicinity of the bottom, or diverge in the direction of the bottom. As long as the form and dimension of the holder do not converge in the direction of the bottom, it will be possible to effectively prevent the holder becoming blocked. A divergent form can have advantages when the plant material is blown out of the holder. It is then however more difficult to ensure that a plug of substrate remains properly in its intended position during cultivation of the plant material. It is thus expected that a preferred embodiment will have the feature that the walls of the holder are parallel and will have a constant form and dimension at least in the vicinity of the bottom. Additionally and/or alternatively a narrowed portion or other support for the plant material can be provided in the interior of the holder for the purpose of preventing the plant material sinking downward in the holder.

The holder is preferably manufactured from a transparent material. This is particularly advantageous when use is made of a vision system, for instance with a camera or other CCD element. Any random form of a camera or vision means can be applied here. Because the material of the holder is transparent or translucent, such a vision system can result in findings in respect of the growth achieved by the plant material, the colour of the individual plant materials in individual holders, the condition and the health of the plant material, etc. On the basis of findings resulting from detections with the vision means, decisions can be made about the moment and location at which the plant material is removed from the holder, preferably using the airflow or water flow as described above, which can be provided using a nozzle.

A device according to the invention can further comprise more than one holder. The holders can be fixedly attached to each other. The holders can also be releasably coupled. Connecting plates can be applied between the holders for this purpose and can comprise the coupling means when the holders can be connected releasably to each other.

In a particularly favourable embodiment connecting means are formed as a foldable member. It is hereby possible to set out the holders exposed to light at predetermined mutual intermediate distances in an extended position of the member. In addition, such a foldable member can allow the holders to be transported in space-saving manner in a compressed position of the member.

In a highly favourable embodiment the foldable member also forms a sealing foil, which can for instance be arranged over the opening at the bottom with a heat sealing and, in certain preferred embodiments, also at the access lying opposite the bottom. The sealing foil or the foldable member thus fulfils in highly favourable manner a dual function for closing the holders and imparting cohesion thereto for the purpose of transport and/or processing by the system.

The main elements of a system have thus already been touched on above. It can further be stated in this respect that a system must further comprise a displacer for displacing the holder and the nozzle relative to each other in a relative movement. The holder can thus be placed in the vicinity of the nozzle for the purpose of blowing the plant material out of the holder. The holder can then be removed from the nozzle and a new holder can be supplied to the nozzle. It is thus found that a fully automated processing of the holders is possible and that impairing of or damage to the plant material can also be prevented to a great extent with a system and a device according to the present invention. Automation can be further enhanced when different holders form a unit with a piece of plant material in each of the individual holders. The holders can then for instance be arranged in a series. This series can then be carried holder by holder past the nozzle. Receiving or collecting means will then have to be positioned below the holder, for which purpose a transporter can be provided in the system according to the invention. Individual specimens of the plant material can thus be blown out of individual holders into wells or individual receiving means in a tray, receptacle or other container, which in turn must then be displaced in each case, preferably relative to the nozzle, in order to make available a new receiving or collecting well for the purpose of blowing the plant material therein from the holder. The movements of the holder relative to the nozzle and of the container with receiving means relative to the nozzle are preferably coordinated by means of a control, which can take account of detections of the vision means and can moreover ensure that two specimens of the plant material cannot come to lie at the same position at any given moment.

An embodiment will be described hereinbelow with reference to the accompanying drawings, in which the same and similar parts, components and considerations are designated with the same reference numerals and in which non-limitative embodiments of the present invention are shown only by way of example, and in which.

Figure 1:
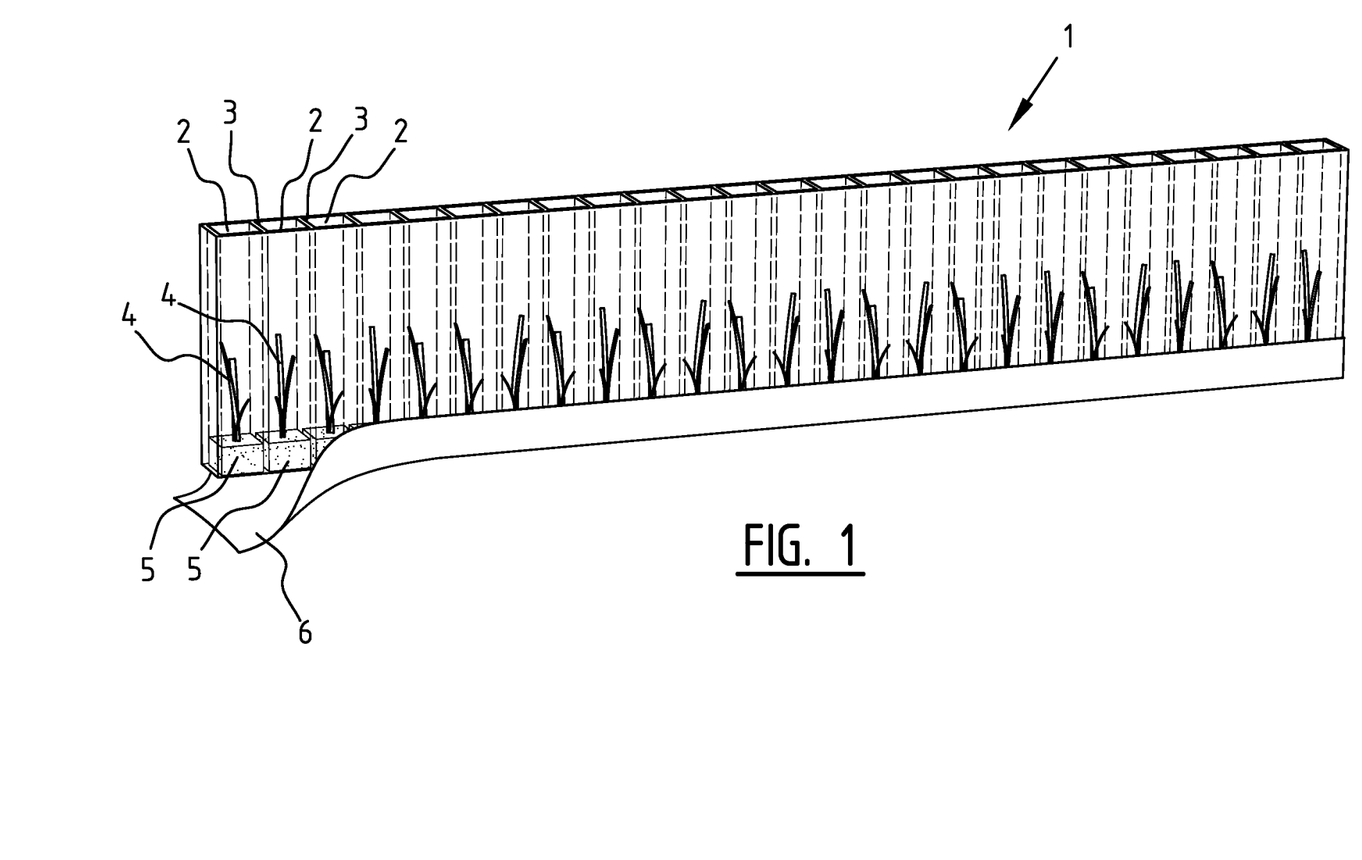
FIG. 1 shows a first embodiment of a device according to the present invention.

FIG. 1 shows a device 1 according to the present invention. Device 1 comprises a number of tubular holders 2 which are separated from each other by intermediate partitions 3. In the embodiment shown here device 1 according to the present invention is thus similar to a strip of hollow plate material with an interior structure for the purpose of defining the individual holders. Holders 2 are open on the top side. Access to each of holders 2 is possible on this top side, for instance for the purpose of inserting plant material 4. The plant material is then set or placed in substrate material 5. Substrate material 5 can be introduced into holders 2 simultaneously with or prior to plant material 4. Substrate material 5 can optionally even be introduced from the underside in FIG. 1 prior to the arranging of an adhesive tape 6. Plant material 4 can however also be inserted simultaneously with the substrate material from what will be referred to here as the bottom of holders 2 before adhesive tape 6 is arranged.

It is noted that it is also possible that only plant material can have been or be provided in holders 2, i.e. without substrate material 5. As will be described below with reference to FIG. 5, additional measures can then be or have been taken in order to hold plant material 4 at a desired location in holders 2, such as for instance a narrowed portion or constriction in tubular holders 2. It is likewise possible that plant material 4 then remains at a desired position in the holders without such measures, but on the basis of adhesive force and outward oriented pressure of the plant material 4 against the inner wall of holders 2.

Instead of adhesive tape a flap (not shown here) or a slide can also be used with which it is possible to close or release holders 2 one by one on the underside (the bottom).

In the situation shown in FIG. 1 adhesive tape 6 has just been removed from the bottom of holders 2. The bottoms of a succession of holders 2 are here left clear one by one. By placing a nozzle on the top side (the access) of one of the holders 2 at a time, the underside (the bottom) of which has been left clear by the removal of adhesive tape 6, plant material 4 can be flushed or blown, optionally with substrate material 5, out of a succession of holders 2. This will be further described hereinbelow with reference to FIGS. 3 and 4. It is then important to note that the plant material is wholly received in tubular holders 3, even after growth thereof for a period of time. Leaves or other plant material can thus be prevented from protruding over the upper edge and possibly forming an obstruction during the flushing or blowing out of the plant material if it were to come to lie between the edge and a flushing or blow nozzle.

Figure 2:
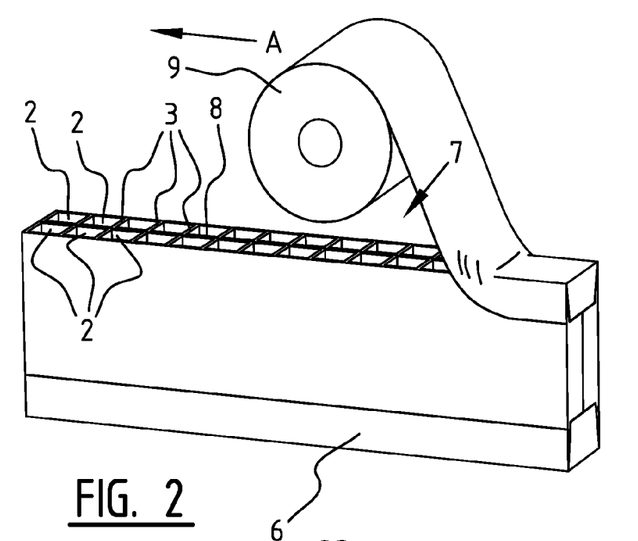
FIG. 2 shows a second embodiment of a device according to the present invention.

FIG. 2 shows an additional and/or other embodiment of a device 7 according to the present invention. This embodiment comprises two mutually adjacent rows of holders 2 with a dividing wall 8 therebetween, wherein transverse partitions 3 are still also present in device 7.

Adhesive tape 6 is once again also arranged over the open bottoms of individual holders 2 in order to enable closing of holders 2 on the underside thereof.

FIG. 2 further shows a roll of adhesive tape 9 with which the top sides of holders 2 can be closed. In the view of FIG. 2 the roll of adhesive tape 9 is moved in the direction of arrow A in order to pull adhesive tape from roll 9 and adhere it over the accesses on the top side of the individual holders 2. This is similar to the method with which adhesive tape 6 can be arranged on the underside of holders 2.

Figure 3:
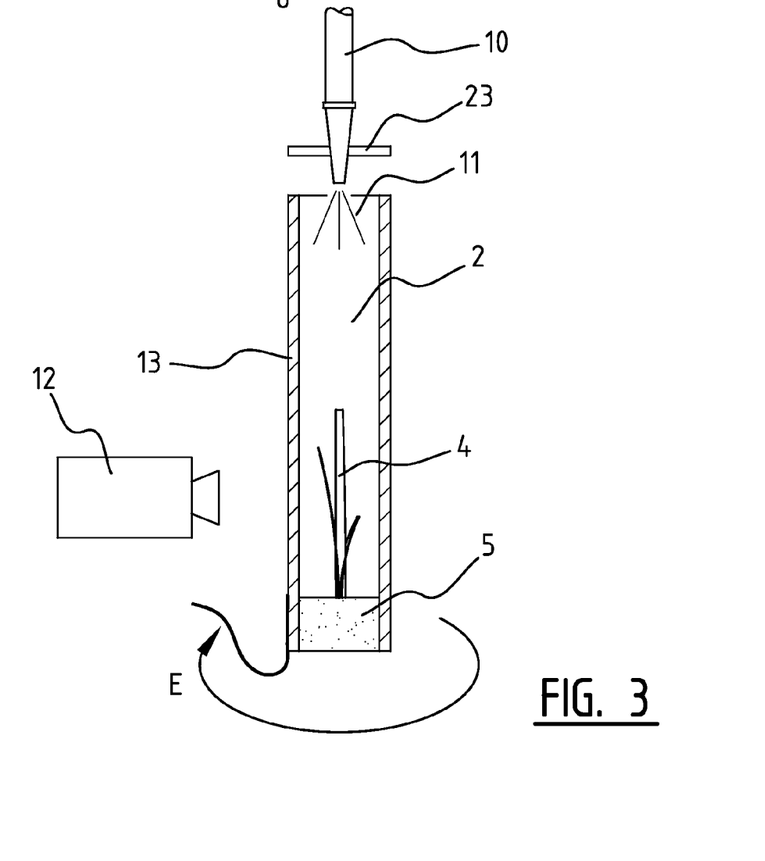
FIG. 3 shows the relation of the device of FIG. 1 to the operation of a system according to the present invention.

FIG. 3 shows a view of the most elementary operation of a system according to the present invention. Only a single holder 2 is shown here, with substrate material 5 and plant material 4 therein. The underside of holder 2 is open, but closed with adhesive tape 6, and can be opened by removing adhesive tape 6 in the direction of arrow E. Substrate material 5 and plant material 4 remain "suspended" in holder 2 due to adhesive force or pressure. As described below with reference to FIG. 5, a narrowed portion or other support can also be utilized for this purpose.

A nozzle 10 is set into operation at a desired moment. Nozzle 10 is positioned for this purpose in or at the open top side of holder 2 in order to cause an air or water jet 11 to flow into holder 2. The thereby generated pressure can be low, to the extent it is then adequate or sufficient to remove plant material 4, optionally also with substrate material 5, from holder 2. This removal then takes place along the open underside or bottom of holder 2.

Additionally or alternatively the nozzle can be set into operation on the basis of detections with a camera 12. Camera 12 can be oriented toward plant material 4 and can comprise a video camera, a digital camera, a CCD or any other embodiment of vision means. Using such a vision system, of which camera 12 forms part, it is also possible to establish the health of the plant material. It is thus possible to already make decisions at a very early stage regarding healthy or unhealthy plant material 4. Wall 13 of holder 2 is for this purpose translucent or transparent and it is possible to work with images of plant material 4 obtained from camera 12 to make decisions or conclusions about the plant material.

FIG. 4 once again shows a camera 12 in a system 14 according to the present invention, which is adapted to function with a device 7, likewise according to the present invention as shown in FIG. 2, i.e. with two rows of holders 2. Device 7 is placed in a suspension 15 with which device 7 is movable in the direction of double arrow B using a drive formed by motor 16.

Figure 4:
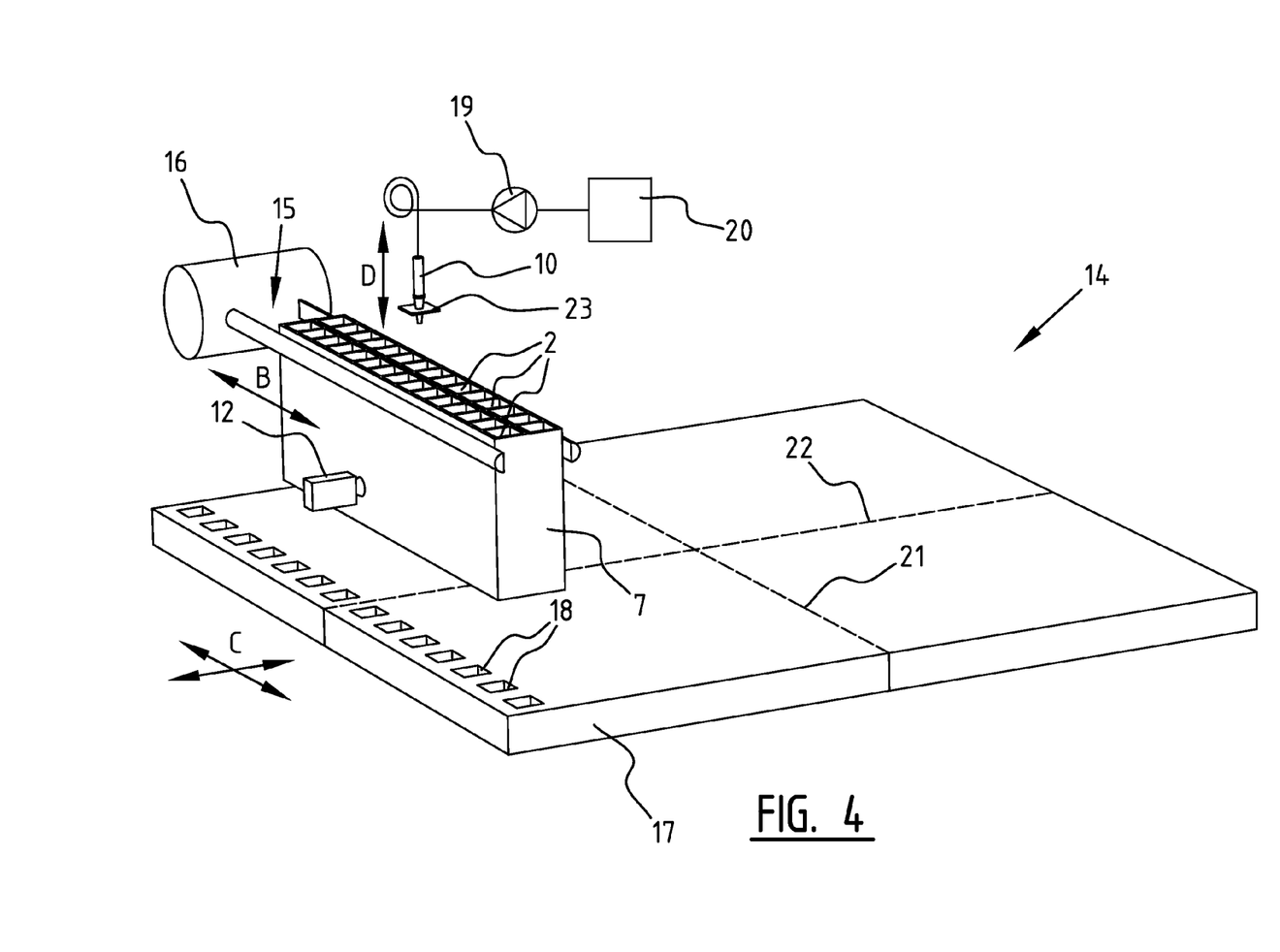
FIG. 4 shows in highly schematic manner a possible embodiment of a system according to the present invention.

A container 17 is placed under device 7, preferably on a translating table, the operation of which is shown schematically with double arrows C. Container 17 comprises in the upper surface thereof a number of wells 18 in which the plant material from holders 2 must come to lie. For a desired alignment of one holder 2 at a time relative to one of the wells 18, the translating table can be moved in the direction of double arrows C in combination with a movement of device 7 in the direction of double arrows B. When a desired holder 2 is aligned with an intended well or hole 18 in container 17, having therein for instance substrate or garden soil, fibre material etc., nozzle 10 can be placed on the open top side of the relevant holder 2 after a movement in the direction of double arrow D. A pump 19 can then be set into operation in order to pump fluid from a reservoir 20 into the relevant holder 2. The fluid can comprise air, gas, water etc. When pump 19 is set into operation with nozzle 10 on the open top side of relevant holder 2, plant material 4 is pressed out of the holder and comes to lie in a desired or intended well 18. Camera 12 can here play a preferred, though not essential part.

If plant material 4 in a relevant holder 2 is not healthy, which can be ascertained from the colour of plant material 4, container 17 can then be pulled away from under device 7 and pump 19 still set into operation to allow the plant material to drop down alongside container 17. When an image is obtained with camera 12 which indicates plant material with a determined colour, the specimens of the plant material with the same colour from individual holders 2 can be grouped in container 17, this being indicated with dividing lines 21, 22, which could likewise relate to individual containers for grouping the plant material having in each case a shared characteristic. Not only is it thus possible to select according to colour or health, but also according to development. Plant material in one of the holders 2, which has developed further than the plant material in directly adjacent holders 2, can then be set down at a location in container 17 (or in another container) other than the plant material from the directly adjacent holders 2. Various selection criteria can thus be applied.

It is further also noted that a collar 23 is arranged on nozzle 10 in the view of FIG. 3. This collar serves for a good closure of the top side of holder 2, particularly in the case that an airflow 11 comes from nozzle 10. It may be important for this purpose to ensure that no leaves or other part of the plant material are clamped between the upper edge of the holder and collar 23. With collar 23 the pressure can be raised to a desired level in the interior of holder 2. It is further noted that only a single camera 12 is shown in FIG. 4, while two rows of holders 2 are disposed adjacently of each other in the single device 7 according to the present invention. It is thus very well possible for an additional camera to be disposed opposite camera 12 relative to device 7. It is further possible in such an embodiment that dividing wall 8 in FIG. 2 could be reflective, or in any case non-transparent. This could also be realized using other means. The purpose hereof is that no image need be obtained of plant material in an adjacent holder relative to a holder to be inspected.

Figure 5:
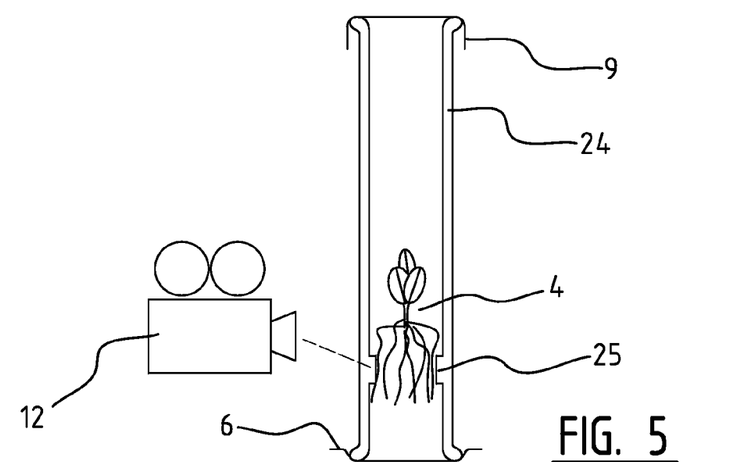
FIG. 5 shows an embodiment of a holder with a narrowed portion serving as support.

FIG. 5 shows an embodiment of a holder 24, the underside of which is closed with adhesive tape 6 and the top side of which is closed with adhesive tape 9. CCD camera 12 is oriented toward a location where, with some certainty, a root system and/or leaves of plant material 4 are situated. It is particularly notable that camera 12 can be oriented toward a root system of plant material 4, this not having been seen before in the known art. The embodiment of holder 24 in FIG. 5 is further distinguished from other embodiments shown and described here by a narrowed portion 25, which forms a support for the root system of plant material 4. It can thus be predicted with some certainty where the root system will be located, this being in the vicinity of narrowed portion 25. Narrowed portion 25 thus forms a support for the root system of plant material 4 even if this root system is situated in substrate material, which is not shown here in FIG. 5.

Figures 6, 7:
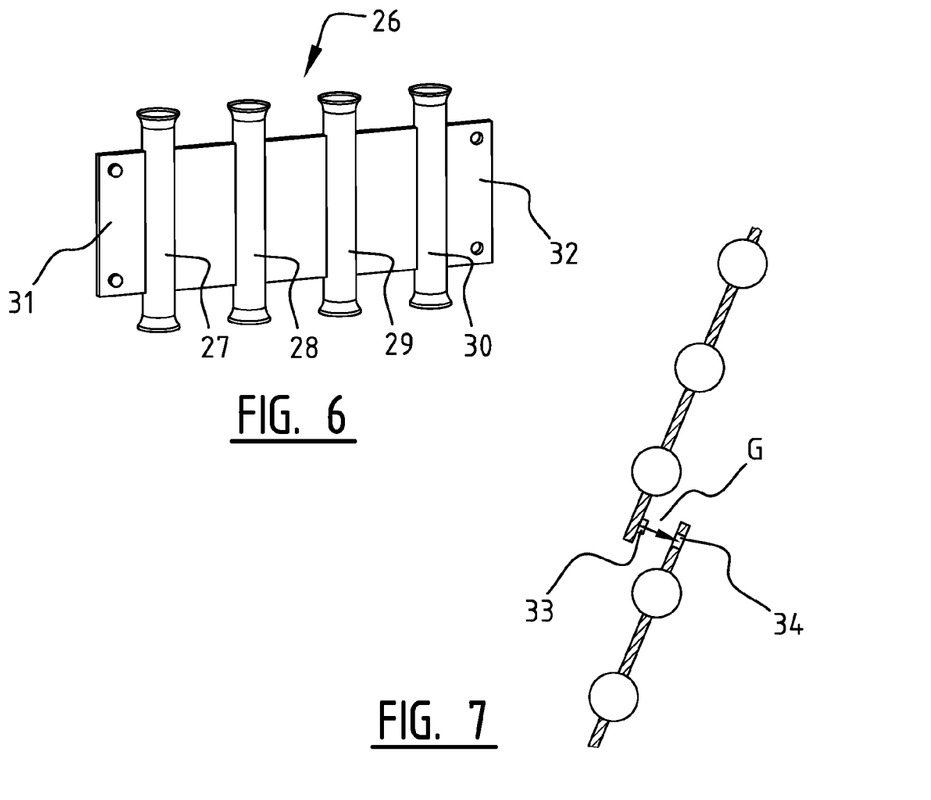
FIG. 6 shows an embodiment of a device with two or more rigidly connected holders in a series.
FIG. 7 shows an embodiment wherein series of holders can be mutually coupled.

FIG. 6 shows another embodiment of a device 26 with a series of four holders 27-30. Holders 27-30 are mutually connected by means of connecting plates. The outer connecting plates 31, 32 comprise coupling means. A series longer than the four shown holders 27-30 can thus be formed at well predefined intermediate distances. In a coupled situation as shown in FIG. 7 the outer connecting plates 31, 32 at least partially overlap each other when a pin-hole connection 33, 34 is activated in the direction of arrow G. The intermediate distance between holders in adjacent series 26 will thus be the same as the intermediate distance between individual holders 27, 30 in a single device 26 as shown in FIG. 6. This makes a mechanical automated processing by means of an installation or system according to the present invention better and easier to realize.

Figure 8:
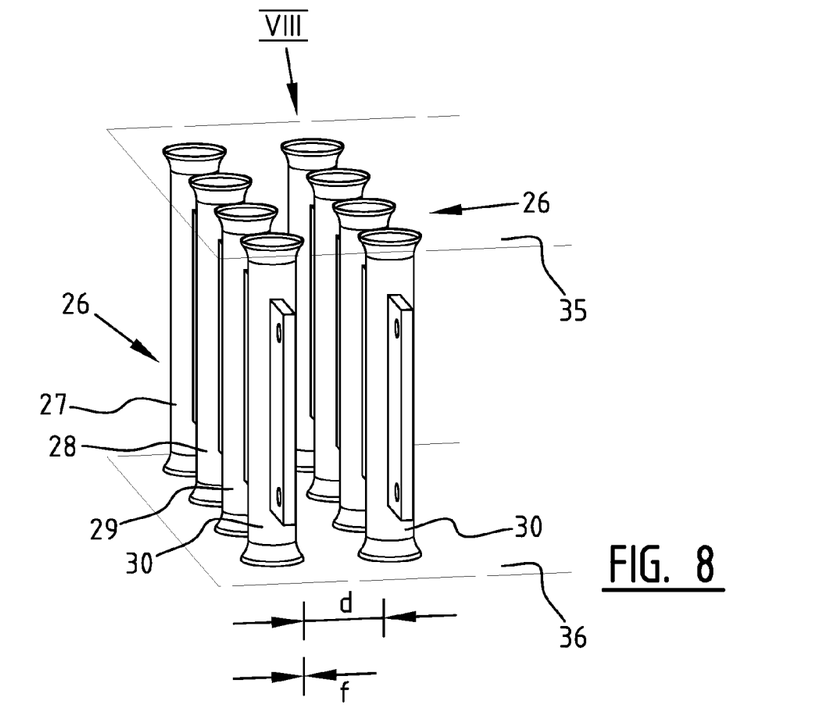
FIG. 8 shows an embodiment with a foldable member which also forms a closing element serving as sealing foil in an extended situation, for instance for raising plant material.
Figure 9:
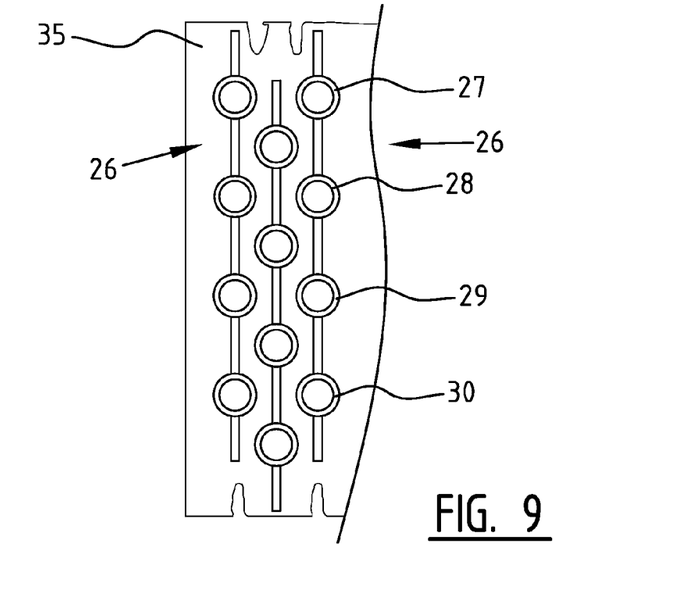
FIG. 9 shows the embodiment of FIG. 8 in a compressed situation, for instance for transport.

FIG. 8 and FIG. 9 show respectively a perspective view and top view of another embodiment of the present invention. In the embodiment of FIGS. 8 and 9 series of holders such as that shown in FIG. 6 are applied in a device 26, although other embodiments are likewise possible. It is important to note here that the individual holders 27-30 are open at both the top and bottom, and foils 35 and 36 are arranged on the top and bottom sides of individual holders 27-30. Foils 35 and 36 can also be strips which are arranged over a single series 26 of holders 27-30. However, the embodiment shown in FIG. 8 has the advantage of FIG. 9, this being that in FIG. 8 devices 26 are placed at a distance from each other so that the maximum light incidence is possible in the interior of each of the holders 27-30. For transport purposes the position of FIG. 9 is taken up, this being possible because foils 35, 36 are foldable. The individual devices 26 are here placed closer together and foils 35, 36 adjust themselves thereto. Considerable space is thus saved for the purpose of for instance transport. Devices 26 with the grown plant material in devices 27-30 can thus be transported around the world at reduced cost. In the embodiment of FIGS. 8 and 9 individual holders 2 can also be coupled to each other, for instance in a manner comparable to FIG. 7, or a plurality of devices 26 can be mutually connected as in FIG. 6 to form longer series, which can be more readily processed in mechanical and automated manner as a series. The advantage of the arrangement of individual holders 27-30 relative to each other in FIGS. 8 and 9 for the purpose of respectively growth and transport results from the use of foils 35, 36 or any other foldable material. It is noted that a hybrid embodiment is likewise possible, wherein a foldable element is applied with passages therein, into which the individual holders are placed while the open top side and underside thereof can be closed in other ways, for instance with a closure, adhesive tape etc. The same advantage as the favourable embodiment of FIGS. 8 and 9 can then be achieved in the sense that extending of the holders results in a sufficient light incidence, while for transport purposes the individual holders can be placed very close together in order to save space.

It will be apparent after examination of the foregoing that diverse additional and alternative embodiments will occur to the skilled person, all of which must be deemed as embodiments of the present invention unless said devices and systems depart from the letter or spirit of the features and definitions in the appended claims, in particular the independent claims. It is thus possible for holders to be processed individually, this not being shown in the figures. Particularly when a device according to the present invention comprises a row of holders, or an individual holder at a time, it may be possible for the holder or holders to have a form which diverges in downward direction in order to facilitate blowing out or flowing out of plant material 4. In addition to the shown and described sticky tape 9 or adhesive tape 6, use can also be made of a flap or slide construction for the purpose of closing the bottom and/or top side of holders 2. The container shown in FIG. 4 comprises recesses or wells 18. They are arranged at regular intermediate distances. It is however also possible for the system according to the present invention to be able to make such a well or recess at the moment immediately prior to the timing of the blowing out or removal of the plant material from a relevant holder 2.

The invention claimed is:

1. A system for processing at least one device accommodating plant material, the at least one device comprising at least two interconnected holders, in which holders at least the plant material is to be entirely placed, wherein the system comprises:
   a nozzle configured to orient toward an open access of at least one of the at least two holders;
   a displacer configured to displace the at least one device and the nozzle relative to each other in a relative movement; and
   a transporter configured to carry the at least one device along a collector for receiving at least the plant material therein;
   wherein each of the at least two holders of the at least one device have an open top side comprising the open access and an open bottom side and the system is configured to control the nozzle to blow or flush the plant material from the at least two holders successively to desired locations of the collector; and
   wherein the nozzle protrudes into or is placed coplanar with the open top side of at least one of the at least two holders when the plant material is blown or flushed from the at least one of the at least two holders.

2. A system according to claim 1, wherein the at least two holders are transparent and the system further comprises an imager which is configured to be oriented toward a content of the at least two holders.

3. A system according to claim 2, wherein the imager is a video camera or a CCD.

4. A system according to any one of claims 1 to 3, further comprising a controller which is connected at least to the nozzle and the imager and is configured to set the nozzle into operation, subject to a finding with respect to the plant material based on detections with the imager.

5. A system according to any one of claims 1 to 3, further comprising a controller which is connected at least to the nozzle and is configured to set the nozzle into operation in coordinated movement relative to the at least two holders of the at least one device, subject to a desired alignment of at least one of the at least two holders of the at least one device relative to a destination location on or in the collector.

6. A system according to claim 5, wherein the destination location is a well.

7. A system according to claim 5, wherein the controller is configured to effect the coordinated movement subject to at least one of:
   a finding with respect to the plant material based on detections with the imager; and
   a reached alignment of one of the at least two holders relative to the collector in relation to the desired location.

8. A system according to claim 1, further comprising a controller connected at least to the transporter and the displacer that is configured to coordinate movements of the at least one device, the nozzle and the collector relative to each other.

9. A system according to claim 1, comprising a closing element which comprises a closure which can be arranged over the open bottom side.

10. A system according to claim 9, wherein the closing element comprises an adhesive tape which can be arranged over the open bottom side.

11. A system according to claim 10, wherein the adhesive tape is arranged against at least one outward facing side wall of the at least one holder.

12. A system according to claim 9, wherein the closing element comprises a sealing foil which can be arranged over the open bottom side.

13. A system according to claim 12, wherein the sealing foil is arranged with a heat sealing on at least the edge of the open bottom side.

14. A system according to claim 1, wherein the open access of each of the at least two holders lies opposite the open bottom side, which access is substantially open and can be closed with an access closing element.

15. A system according to claim 14, wherein the access closing element comprises at least one of: a closure, an adhesive tape and a sealing foil.

16. A system according to claim 1, wherein the at least two holders each have a form and dimension which are constant at least in a vicinity of the open bottom side.

17. A system according to claim 1, wherein the system comprises plant material entirely contained within the at least two holders.

18. A system according to claim 17, wherein the system comprises substrate material entirely contained within the at least two holders and at the open bottom side of the at least two holders and the system is configured to control the nozzle to blow or flush the substrate material from the at least two holders successively to desired locations of the collector.

19. A system according to claim 1, wherein the nozzle comprises a collar configured to provide a closure on the open top side of at least one of the at least two holders to allow pressure to be raised within an interior of the holder when plant material is blown or flushed from the at least one of the at least two holders.

20. A system according to claim 1, wherein the system is configured to displace the at least one device, the nozzle and the collector relative to each other in a relative movement in at least three different directions.

* * * * *